United States Patent
Schumacher et al.

(10) Patent No.: US 6,907,720 B2
(45) Date of Patent: Jun. 21, 2005

(54) TINE FOR FIXING A CYLINDRICAL CARRIER BAR OF A REEL AND A TINE ASSEMBLY COMPRISING A CARRIER BAR AND AT LEAST ONE TINE

(76) Inventors: Gustav Schumacher, Gartenstrabe 8, Eichelhardt (DE), 57612;
Friedrich-Wilhelm Schumacher, Goldwiese 22, Eichelhardt (DE), 57612

( * ) Notice: Subject to any disclaimer, the term of this patent is extended or adjusted under 35 U.S.C. 154(b) by 0 days.

(21) Appl. No.: 10/492,464
(22) PCT Filed: Oct. 16, 2001
(86) PCT No.: PCT/EP01/11937
§ 371 (c)(1), (2), (4) Date: Apr. 12, 2004
(87) PCT Pub. No.: WO03/032709
PCT Pub. Date: Apr. 24, 2003

(65) Prior Publication Data
US 2004/0182062 A1 Sep. 23, 2004

(51) Int. Cl.⁷ .......................... A01D 76/00; A01D 78/00; A01D 80/00; A01D 84/00
(52) U.S. Cl. ........................................ 56/400
(58) Field of Search .............................. 56/400, 400.16, 56/400.21, 220; 172/707

(56) References Cited
U.S. PATENT DOCUMENTS

| 1,978,717 A | | 10/1934 | Oppenheim | |
|---|---|---|---|---|
| 2,432,653 A | * | 12/1947 | Bloom | 56/400 |
| 3,148,494 A | | 9/1964 | Scheidenhelm | |
| 3,171,243 A | * | 3/1965 | Johnston | 56/400 |
| 4,630,432 A | * | 12/1986 | Love et al. | 56/400 |

* cited by examiner

Primary Examiner—Arpad Fabian Kovacs
(74) Attorney, Agent, or Firm—Harness, Dickey & Pierce, P.L.C.

(57) ABSTRACT

A tine for fixing to a cylindrical carrier tube of a reel, in addition to a tine assembly comprising a carrier tube and a tine. The tine (8) comprises the following: a coil spring section (10) with at least one convolution wound about a coil spring axis (11) as far as a screw line; an engagement section (14), which is immediately adjacent to and leads continuously from the first end (12) of the convolution of the coil spring section (10), terminating in a free end (15); a fixing section (16), which is immediately adjacent to the second end (13) of the convolution and whose free end is bent to form an eyelet (17) with a through opening (18) that projects towards the first end (12) of the convolution; and a bearing section (19) located upstream of the eyelet (17). The coil spring axis (11) and the bending axis (2) are offset in the same direction in relation to the engagement section (14). The longitudinal axis (2) constitutes the bending axis and runs parallel to the coil spring axis (11). The carrier tube (1, 101) is located between an exterior peripheral section of the coil spring section (10) and the fixing section (16), in such a way that it is partially surrounded by the sections. The tine (8) is fixed to the cylindrical carrier tube (1) by a fixing screw (5).

6 Claims, 3 Drawing Sheets

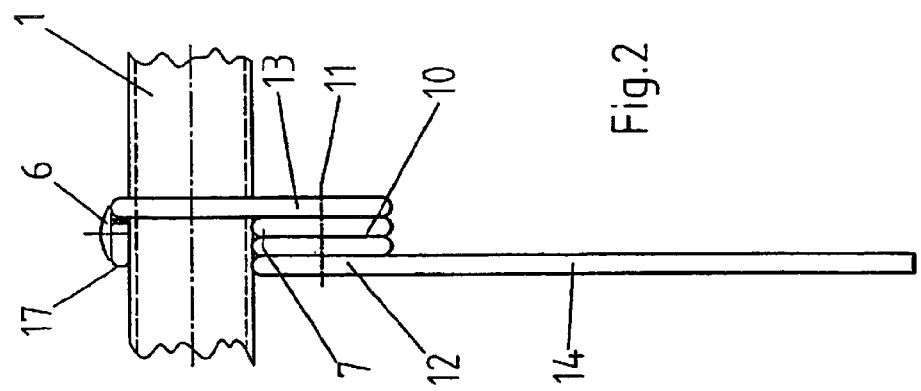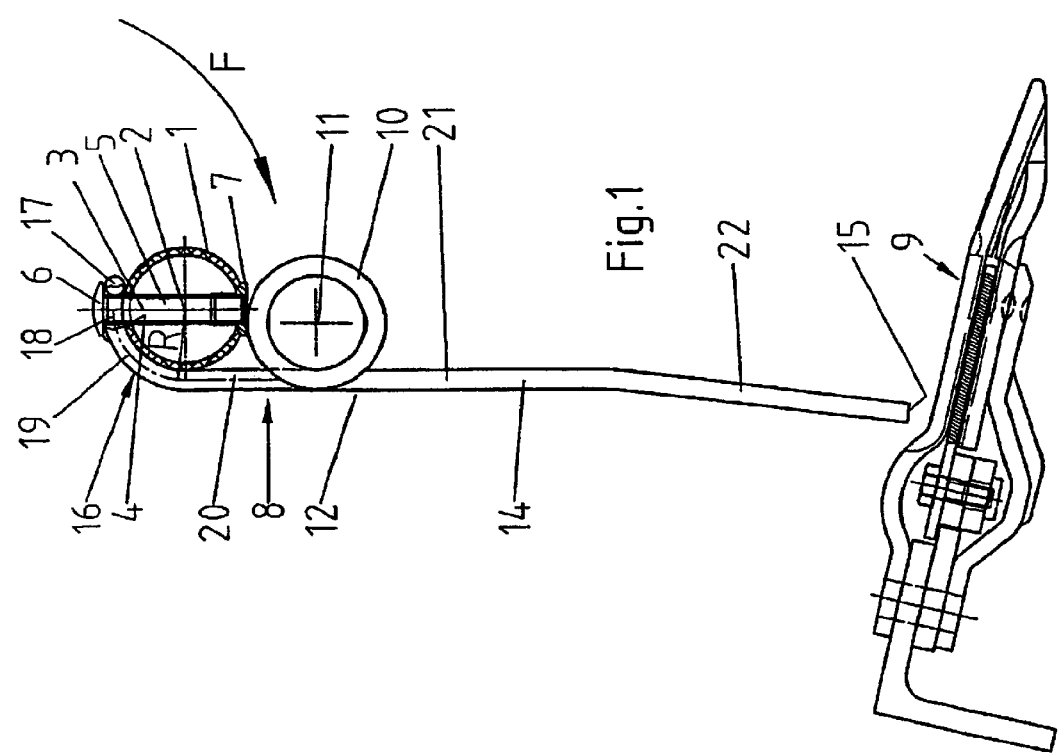

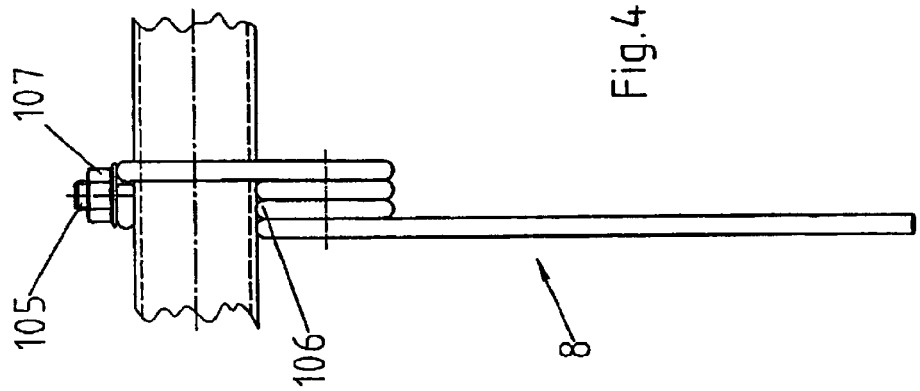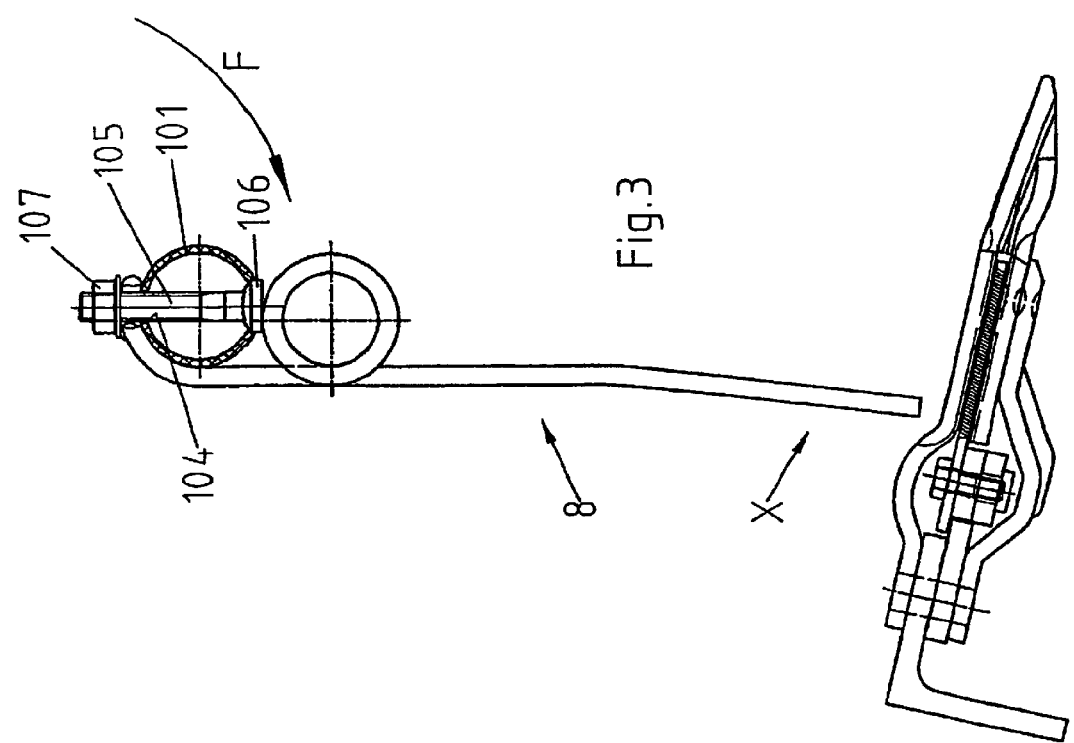

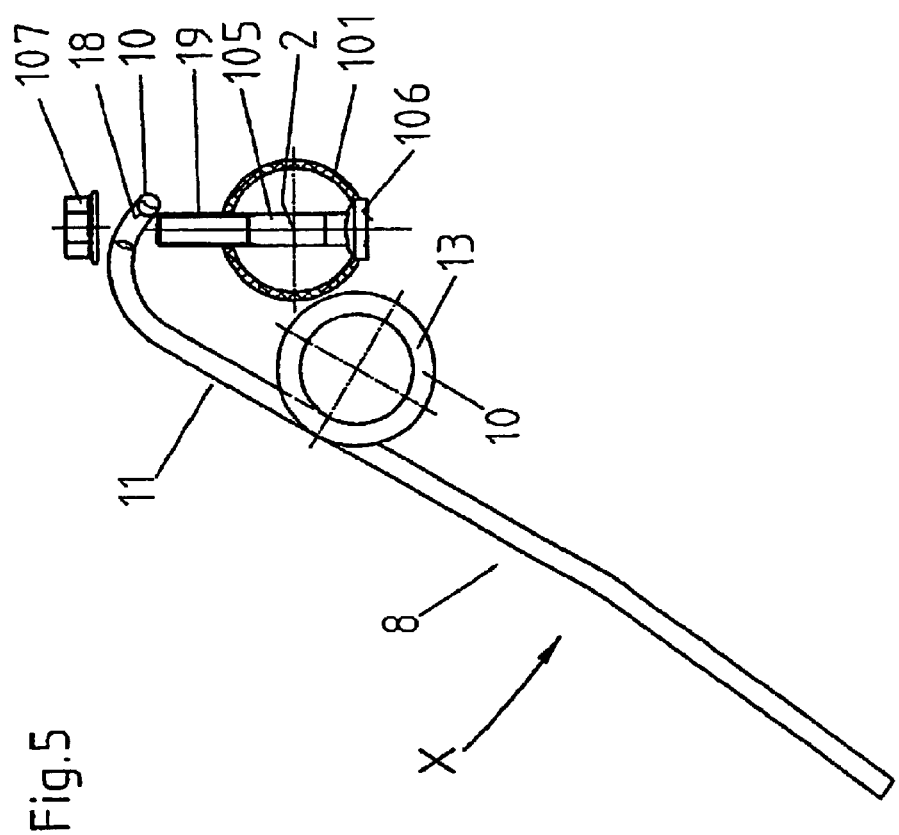

TINE FOR FIXING A CYLINDRICAL CARRIER BAR OF A REEL AND A TINE ASSEMBLY COMPRISING A CARRIER BAR AND AT LEAST ONE TINE

FIELD OF THE INVENTION

The invention relates to a tine attached to a cylindrical carrier tube of a reel for mowing devices on harvesting machines. The tine is made from a basic material which is round and rod-like. Further, the invention relates to a tine arrangement including a cylindrical carrier tube and at least one such tine.

BACKGROUND OF THE INVENTION

A reel of a harvesting machine generally includes several carrier tubes. The tubes are radially distanced from a central tube and distributed around the circumference of the central tube. The carrier tubes are supported by corresponding support arms connected to the central tube. The carrier tubes are rotationally supported on the support arms. Furthermore, the reel is rotationally supported around the axis of the central tube. Depending on the width of a cutting table of a harvesting machine, the reel is very long and the carrier tubes are correspondingly long. The carrier tubes carry tines which are arranged and distributed over its length. For example, 40 or more tines are generally attached on a six meter long carrier tube. In a reel with six carrier tubes, there are 240 or more tines arranged along the carrier tube. The tines are generally made from a spring steel wire, such as a rod-like material. The spring properties of the tines are realised by a coil spring portion. The coil spring portion is designed so that the tine can deflect when obstacles, such as earth bulges or larger stones, are present in front of the mowing device. Different embodiments are known for the attachment of the tines on the carrier tube.

DE 198 58 452 A1 describes an arrangement where the carrier tube has one or several longitudinal grooves. The tines have a winding with a bent end which engages the grooves. An end of the winding of a coil spring portion is bent to form a yoke-like portion which engages over the carrier tube. The yoke ends exceed the diameter of the carrier tube and form openings. A screw is passed transversally to the longitudinal axis of the carrier tube for tightening the carrier tube. A disadvantage is that profiled tubes are expensive. The design necessitates tines, made as pairs, which connection portions engage in one of the grooves.

U.S. Pat. No. 5,007,235 describes a tine arrangement with a double tine having two coil spring portions. A joint attachment in a rotational direction around the longitudinal axis of the carrier tube is achieved by a fixing screw. The screw passes the carrier tube transversally to the extension of the engagement portions of the tines. A disadvantage of this fixing type is that the fixing eyelet is laterally off-set to the engagement portions by the length of the coil spring portion. The eyelet is not arranged on or near the loading line of the engagement portion. Therefore, a rotational loading is produced. Due to the loading, also in the above described embodiment, the coil spring portion is formed extending around the carrier tube.

SUMMARY OF THE INVENTION

The invention includes an attachment tine attached on a cylindrical carrier tube of a reel, as well as a tine arrangement with a carrier tube having at least one tine. The tines, in form of individual tines, are suitable for an application in connection with cylindrical carrier tubes. The attachment, with reference to loading, does not experience displacement around an axis arranged perpendicular to the longitudinal axis of the carrier tube. Also, the tines can be easily mounted.

A tine is attached on a cylindrical carrier tube of a reel for mowing devices on harvesting machines. The tine is made from a basic material with a round cross-section and is rod-like. A coil spring portion of the tine is wound to a coil line with at least one winding around a coil spring axis. The coil spring portion has a first winding end and a second winding end. A straight or bent engagement portion continuously follows the first winding end of the coil spring portion. The straight or bent engagement portion ends in a free end. A fixing portion is continuous with the second winding end. The second winding end is bent at a free end into an eyelet with a through opening. The eyelet projects in a direction towards the first winding end. The second winding end has an abutment portion arranged in front of the eyelet. The second winding end extends on a circular arc centred on a bending axis arranged parallel to the coil spring axis. A transition portion follows the abutment portion and ends in the second winding end. The coil spring axis and the bending axis are off-set in the same direction from the engagement portion.

The eyelet is connected to the second winding end such that an abutment portion, bent corresponding to the outer circumference of the carrier tube, precedes and ends with a transition portion in the second winding end of the coil spring portion.

The abutment portion closely abuts the outer circumference of the cylindrical carrier tube. The eyelet orientation provides an arrangement for the screw. In the resting position of the tine, the screw extends nearly parallel to the transition portion or the abutment portion, respectively. When loading the tine at the engagement portion, the screw is not subjected to tensioning, but to shearing. This has the advantage that negative loadings do not act onto the tube, as at pure tensioning loading, a stronger clamping would have to be provided, which produces the danger of reducing the tube in cross-section.

The carrier tube is not contracted by the loading. The screw which provides the attachment cannot be loosened. The tightening torque for the fixing screw can, in this case, be smaller. A further advantage is, that, because the eyelet is arranged nearly in one plane with the engagement portion, no leverage effect, which wants to rotate the tine, is produced. Since the eyelet projects in the direction towards the first winding end, it is arranged in the length portion of the coil spring portion. Thus, the total width of the tine is small and the pitch of the fixing bores on the carrier tube is easier to determine.

Preferably, the engagement portion has, starting from the first winding end, a first portion. The first portion is arranged in one plane with the transition portion of the fixing portion. The transition portion and the engagement portion project in opposite directions from the coil spring portion. Preferably the eyelet is arranged perpendicular to a plane, formed by the circular arc-like abutment portion.

A tine arrangement for a reel of a mowing devices on harvesting machines comprises a cylindrical carrier tube with a longitudinal axis. A through bore extends transversally to the longitudinal axis. A fixing screw has a screw head and a nut. At least one tine is provided which comprises a coil spring portion wound to a coil line with at least one winding around a coil spring axis. The coil spring portion has a first winding end and a second winding end. A straight or bent engagement portion continuously follows the first winding end of the coil spring portion. The straight or bent portion ends in a free end. A fixing portion is continuously attached to the second winding end. The fixing portion is bent at a free end into an eyelet with a through opening. The eyelet projects in the direction towards the first winding end. An abutment portion is arranged in front of the eyelet. The abutment portion extends on a circular arc centred on a bending axis arranged parallel to the coil spring axis. A transition portion follows the abutment portion and ends in the second winding end. The coil spring axis and the bending axis are off-set in the same direction from the engagement portion. The carrier tube longitudinal axis corresponds to the bending axis and extends parallel to the coil spring axis. The carrier tube is arranged between an outer circumferential portion of the coil spring portion and the fixing portion. Thus, the carrier tube is partially enclosed by the coil spring and fixing portions.

This arrangement provides numerous advantages. One advantage is a desired screw arrangement. Furthermore, the carrier tube is enclosed between the abutment portion and the coil spring portion which achieves advantageous assembling. The coil spring portion is directly supported on the screw head or the nut. Thus, no direct contact for the support of the forces, loading the engagement portion, is produced on the carrier tube which leads to wear. The components belonging to the fixing screw, like the screw head and the nut, are manufactured from a more wear-resistant material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side view partially in cross-section of the tine according to the invention arranged on a carrier tube with a mowing finger;

FIG. 2 is a front view of the tine without the mowing finger of a first embodiment of a fixing screw;

FIG. 3 is a side view partially in section like FIG. 1, however, a different fixing screw is illustrated;

FIG. 4 is a front view of the tine arrangement of FIG. 3;

FIG. 5 is an exploded partially in section view of mounting a tine with a fixing screw of the embodiment of FIGS. 3 and 4.

DETAILED DESCRIPTION OF THE PREFERRED EMBODIMENTS

The following description of the preferred embodiment(s) is merely exemplary in nature and is in no way intended to limit the invention, its application, or uses.

Firstly, the embodiment of the tine of FIGS. 1 and 2 is described. A cylindrical carrier tube 1 defines a longitudinal axis 2. A through bore 4 extends transversally to the longitudinal axis 2 through the carrier tube 1 to define a bore axis 3 A fixing screw 5 with a screw head 6 and a nut 7 pass through bore 4. The fixing screw 5 attaches to the carrier tube 1. The tine transports stems cut by the mowing sickle. The tine is movable in the area of the mowing finger 9 away from the area of the mowing finger 9. The carrier tube 1, attached to a reel star element, can be rotated around an axis off-set to the longitudinal axis 2 in rotational direction F. In this case, the carrier tube 1 itself can additionally be rotated around the longitudinal axis 2.

The tine 8 includes a coil spring portion 10. The rod-like material, from which the tine 8 is manufactured, is coiled, spring-like, around the coil spring axis 11. The coil portion 10 has at least one, preferably, however, several windings. The coil spring portion 10 has a first winding end 12 and distanced thereto, a second winding end 13. These ends project in opposite directions.

An engagement portion 14 is continuously attached to the first winding end 12. The engagement portion 14 has two portions. The first portion 21 extends nearly tangential to the coil. The second portion 22 extends in a bent manner. The engagement portion 14 ends at a free end 15.

The second winding end 13 is continuously followed by a fixing portion 16. The fixing portion 16 includes a transition portion 20 arranged substantially in one plane with the first portion 21 of the engagement portion 14. The transition portion 20 is followed by an abutment portion 19. The abutment portion 19 encloses a circular arc of nearly 90°. The arc path is adapted to the outer face of the cylindrical carrier tube 1. In FIG. 1 the bending radius R is shown. The bending radius refers to the neutral zone of the abutment portion 19. The centre of the bending radius is arranged on the longitudinal axis 2 of the carrier tube 1.

The fixing portion 16 also includes a fixing eyelet 17. The fixing eyelet 17 follows the abutment portion 19. The eyelet 17 extends in a circular arc and is bent thereto. The eyelet 17 projects in the direction towards the first winding end 12. The through opening 18 of the eyelet 17, for the fixing screw 5, is also arranged in an area between the first winding end 12 and the second winding end 13. Thus, a short structural arrangement in the direction of the longitudinal axis 2 can be achieved.

The structure can be selected so that a short as possible axial distance exists in the direction of the longitudinal axis 2 between the engagement portion 14 and the bore axis 3. The axis, defining the through opening 18, is achieved to prevent, during loading of the engagement portion 14, a displacement of the tine 8. The fixing portion 16 is off-set in relation to the transition portion 20 and to the first portion 21 of the engagement portion 14 in the same sense as to the coils spring portion 10. This means, that the coil spring axis 11 and the bending axis 2, for the abutment portion 19 are off-set in the same sense. Thus, the carrier tube 1 is received between the coil portion and the abutment portion. During loading of the engagement portion 14, in this arrangement, the fixing screw 3 is mainly subjected to shearing.

The fixing screw 3 is a screw with a flat screw head 6 with a hexagonal socket. The nut 7 is formed as a collar nut and is inserted into the carrier tube from the coil spring portion-facing side of the through bore 4. The coil spring portion 10 is supported with a portion of its outer circumference on the nut 7. In this case, the nut 7 can be provided with a torsional retainment.

In the embodiment of FIGS. 3 and 4 a tine 8 is used, which corresponds completely to the tine described in connection with FIGS. 1 and 2. The only difference is between the design of the fixing screw 105 in relation to the fixing screw 5.

In FIG. 3 the loading direction X for the engagement portion is shown. The fixing screw 105 differs in reference to the arrangement of the fixing screw in the embodiment of FIGS. 1 and 2. The screw head 106 is arranged in the area of the coil spring portion of the tine 8. The nut 107 is correspondingly screwed onto the thread 104 of the fixing screw 105 in the area of the eyelet.

FIG. 5 shows the assembly of the tine in FIGS. 3 and 4. The fixing screw 105 is already pushed into the through bore of the carrier tube 101. The tine 8 is pushed in an inclined position, as shown in FIG. 5, with the through opening 18 of the eyelet onto the threaded portion of the fixing screw 105. A thread portion radially exits the carrier tube 101. The tine 8 is acted on in the direction of the arrow X to achieve a counter-clockwise torque. This pivots the tine 8 so that the coil spring portion 10 comes into abutment with and is supported on the screw head 106. Because of this, the fixing screw 105 is initially retained in its position. The nut 107 can be screwed on after the tine 8 has been rotated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tine for attachment to a cylindrical carrier tube of a reel for mowing devices on harvesting machines, the tine is made from a material which has a round cross-section and is rod-like, said tine comprising:
    a coil spring portion wound to a coil line with at least one winding around a coil spring axis, said coil spring portion having a first winding end and a second winding end,
    a straight or bent engagement portion continuously following the first winding end of the coil spring portion, said straight or bent engagement portion ending in a free end,
    a fixing portion continuously attached to the second winding end, said fixing portion being bent at a second free end into an eyelet with a through opening, said eyelet projects in a direction towards the first winding end;
    an abutment portion arranged in front of the eyelet and extending on a circular arc, said abutment centered on a bending axis arranged parallel to the coil spring axis;
    a transition portion, following the abutment portion and ending in the second winding end; and
    said coil spring axis and bending axis being off-set in the same direction from the engagement portion.

2. The tine according to claim 1, wherein the engagement portion has, starting from the first winding end, a first portion arranged in one place with the transition portion of the fixing portion.

3. The tine according to claim 2, wherein the transition portion and the engagement portion extend in opposite directions from the coil spring portion.

4. The tine according to claim 1, wherein the eyelet extends perpendicular to a plane formed by the circular arc-like abutment portion.

5. A tine arrangement for a reel for mowing devices on harvesting machines, comprising:
    a cylindrical carrier tube defining a longitudinal axis and extending transversally thereto, a through bore in said cylindrical tube;
    a fixing screw having a screw head and a nut; and
    at least one tine comprising;
        a coil spring portion wound with at least one winding around a coil spring axis, said coil spring portion having a first winding end and a second winding end,
        a straight or bent engagement portion continuously following the first winding end of the coil spring portion, said straight or bent engagement portion ending in a free end,
        a fixing portion continuously attached to the second winding end, said fixing portion being bent at a free end into an eyelet with a through opening, said eyelet projects in a direction towards the first winding end;
        an abutment portion arranged in front of the eyelet and extending on a circular arc, said abutment centred on a bending axis arranged parallel to the coil spring axis, and
        a transition portion, following the abutment portion and ending in the second winding end;
        said coil spring axis and bending axis being off-set in the same direction from the engagement portion; and
    said long longitudinal axis represents the bending axis and extends parallel to the coil spring axis and wherein the carrier tube is arranged between an outer circumferential portion of the coil spring portion and the fixing portion so that it is partially enclosed by said coil spring portion and said fixed portion.

6. The tine arrangement according to claim 5, wherein the coil spring portion is supported on the screw head or on the nut of the fixing screw.

* * * * *